United States Patent [19]

McClelland et al.

[11] Patent Number: 5,154,108
[45] Date of Patent: Oct. 13, 1992

[54] COMPACT METALLIC BELLOWS

[75] Inventors: Gordon R. McClelland, Ridgecrest; Robert J. Steele, III, Inyokern, both of Calif.

[73] Assignee: The United States of America as represented by the Department of the Navy, Washington, D.C.

[21] Appl. No.: 526,415

[22] Filed: May 17, 1990

[51] Int. Cl.⁵ ............................. F01B 19/00; F16J 3/00
[52] U.S. Cl. ............................................. 92/35; 92/34; 92/47; 29/454
[58] Field of Search ................. 92/34, 35, 45, 47, 103; 228/182; 219/121.63, 121.64, 121.14; 29/888, DIG. 48, 890.39, 454

[56] References Cited

U.S. PATENT DOCUMENTS

| 2,084,496 | 6/1937 | Lockwood | 92/45 |
| 2,682,893 | 7/1954 | Ziebold | 92/45 |
| 2,771,095 | 11/1956 | Peters | 92/45 |
| 2,811,173 | 10/1957 | Benson | 29/454 |
| 2,925,829 | 2/1960 | Thompson, Sr. | 29/454 |
| 3,233,632 | 2/1966 | Voitik | 228/182 |
| 3,782,156 | 1/1974 | Panfill | 72/59 |
| 4,065,947 | 1/1978 | Mazier | 72/59 |
| 4,193,280 | 3/1980 | Mazier | 72/59 |
| 4,364,252 | 12/1982 | Koizumi | 72/59 |
| 4,453,304 | 1/1984 | Astill et al. | 29/421 |
| 4,644,129 | 2/1987 | Miller | 219/121.63 |
| 4,710,050 | 12/1987 | Larsen | 403/51 |
| 4,749,200 | 6/1988 | Sehnal et al. | 277/88 |
| 4,760,236 | 7/1988 | Stoll | 29/454 |
| 4,827,747 | 5/1989 | Okada et al. | 72/59 |
| 4,924,756 | 5/1990 | Berube et al. | 228/182 |

FOREIGN PATENT DOCUMENTS

| 892525 | 4/1944 | France | 92/45 |
| 1377087 | 12/1974 | United Kingdom | 92/34 |

OTHER PUBLICATIONS

Bellows Design Manual by Pacific Scientific pp. 1-3 undated.

Primary Examiner—Edward K. Look
Assistant Examiner—Thomas Denion
Attorney, Agent, or Firm—Harvey A. Gilbert; Melvin J. Sliwka; John L. Forrest, Jr.

[57] ABSTRACT

A compact metal bellows preferably for converting pressure changes into linear motion, has alternating inner and outer welds accomplished by a laser weld technique. An inner weld fixture is provided for deflecting a portion of the bellows away from the very small beam spot of the laser weld process. The compact metallic bellows of the present invention is particularly adapted for fitting into a small space and taking advantage of its equal free length and solid length to provide a spring force equal the sum of the spring force of each of the several metallic diaphragms.

10 Claims, 4 Drawing Sheets

COMPACT METALLIC BELLOWS

BACKGROUND OF THE INVENTION

1. Field of the Invention

The present invention relates in general to a bellows for converting pressure changes into linear motion and pertains, more particularly, to a compact metallic bellows for use in restricted space conditions to convert fluid pressure change into precise valve actuator motion. The compact metallic bellows of this invention further provides an illustration of an improved laser welding technique.

2. Discussion of the Related Art

With conventional diaphragms it is generally understood that a single metal diaphragm can be deflected with a fluid pressure to convert the fluid pressure into a precise linear motion. The diaphragm is also compact and will readily conform to available space allowances. The conventional metal diaphragm, however, requires substantial pressures to cause a desired deflection. Another drawback to the conventional diaphragm is its limited maximum stroke and tendency to relatively early fatigue failure.

Conventional metallic bellows have a free length typically much longer than the solid height. These conventional bellows deflect in both axial directions, in compression and in expansion. These bellows take up significant space since their free length is usually substantially greater than their solid height. Furthermore, conventional bellows are not intended to operate at their solid height due to the extreme stress put on the bellows and the bellows joints in the solid height condition.

A substantial drawback of conventional bellows intended for small or compact space applications is that these bellows must operate at or near their solid height. These operating conditions so shorten the fatigue life of conventional bellows in this highly stressed conditions that standard bellows design and application criteria usually cautions against such use in such severe conditions.

Standard manufacturing methods form bellows in one of three ways. Conventional bellows are made by forming tubing, electro-deposition, or by conventional welding techniques, e.g., gas tungsten arc or plasma arc welding. A new manufacturing technique needed to be developed to make a compact metallic bellows that allows a solid height equal to the free length by providing a welding method that creates a weld no thicker than the thickness of the two adjacent diaphragm members welded together at either the outer diameter edges or the inner diameter edges.

It was believed that a compact bellows would meet the limited space and stroke requirements. This belief has been proven accurate and in the process a unique and novel welding technique has been developed after much trail and error and simply ignoring conventional wisdom in these matters.

Conventional wisdom notwithstanding, a compact bellows has been developed that has a free length equal to its solid height whereby the solid height is accomplished without the stresses normally associated with compressing a conventional bellows to its solid height.

Accordingly, it is an object of the present invention to provide a compact metallic bellows that is adapted to provide a desired expansion by the welding of alternate inner and outer diameters of the diaphragm members.

With the compact metallic bellows of this invention the total spring force of individual members is added in series. Thus, while three members are illustrated in the preferred embodiment, the number of members may be selected as a function of the desired working pressure and stroke required.

Another object of the present invention is to provide a compact metallic bellows that is constructed by a laser welding technique that has been discovered to provide an increase in fatigue life and larger stroke available with relatively less pressure available.

A further object of the present invention is to provide a compact metallic bellows in which its solid height and free length are the same or nearly equal, thereby substantially reducing the height and space requirements in which it can be packaged and effectively used.

Still another object of the present invention is to provide a compact metallic bellows that is adapted to lay flat at its solid height. The compact metallic bellows of this invention is low in stress at or near its solid height to optimize fatigue life when operated at or near the solid height.

Still a further object of the present invention is to provide a compact metallic bellows weld fixture that is adapted to laser weld alternating inner and outer diameters of the diaphragm members in the compact bellows assembly. The compact metallic bellows welding fixture of this invention is characterized by allowing the bellows to lay flat but not involving adjacent pieces in the weld.

Another object of the present invention is to provide a compact metallic bellows with a low stress condition at its free length which happens to be its solid height position. Therefore, the basic compact metal bellows construction of this invention is adapted to operate in a region of optimum fatigue life.

SUMMARY OF THE INVENTION

To accomplish the foregoing and other objects of this invention there is provided a compact metallic bellows for axial movement in expansion only for transferring a pressure signal to a linear movement, for example to control a valve actuator stem in response to a pressure change. The compact metallic bellows comprises a plurality of metallic diaphragm members and each metallic diaphragm member has an inner diameter and an outer diameter. The inner diameter edges and the outer diameter edges of alternating adjacent metallic diaphragm members are welded together to form the compact metallic bellows.

The welded edges alternate between every other one of a plurality of the alternating metallic diaphragm members. The adjacent inner diameter edges and the alternate adjacent outer diameter edges are welded by a novel laser welding technique further described herein.

Each of the adjacent diaphragm members have generally parallel facing surfaces. The compact metallic bellows of the present invention is constructed such that abutting facing surfaces of adjacent diaphragm members rest in a generally flat relationship with one another. This flat construction, not typical for conventional bellows, provides a compact bellows and one with a solid height substantially the same as the free length.

A weld joint is made that joins the edge of adjacent metallic diaphragm members. The weld method of this invention provides a weld joint that has a width no greater than the thickness of the welded metallic diaphragm members which allows the abutting facing surfaces to rest in a generally flat relationship to one another.

In the disclosed embodiment described herein, there are provided a plurality of metallic diaphragm members. More particularly there are three diaphragm members and the inner diameter of at least one metallic diaphragm is less than the inner diameter of the remaining metallic diaphragm members.

Titanium was used for corrosion resistance in this application and proven in tests of various prototypes to be a particularly well suited material from which to construct the circular metallic diaphragm members described below with respect to one preferred embodiment.

A welding fixture is shown and described to hold a plurality of metallic diaphragm members in order to accomplish the laser welding of abutting edges. A preferred welding fixture includes a base member for supporting a plurality of metallic diaphragm members, a clamp and guide member fitting over the metallic diaphragm members supported on the base member, and a deflection member. The deflection member allows a metallic diaphragm member edge of the bellows assembly not requiring inner diameter welding to be deflected away from proximity to the weld location, but does not deflect the diaphragm member edge beyond it's yield point.

A method of welding edges of adjacent metallic diaphragm members is disclosed and includes securing metallic diaphragm members in abutting relationship and welding the edges to provide a weld joint thickness no greater than the combined thickness of the metallic diaphragm members being welded. In a preferred embodiment this can be accomplished using a pulsed laser welding technique.

These and other objects and features of the present invention will be better understood and appreciated from the following detailed description of one embodiment thereof, selected for purposes of illustration and shown in the accompanying drawings.

DETAILED DESCRIPTION

Figure 1:
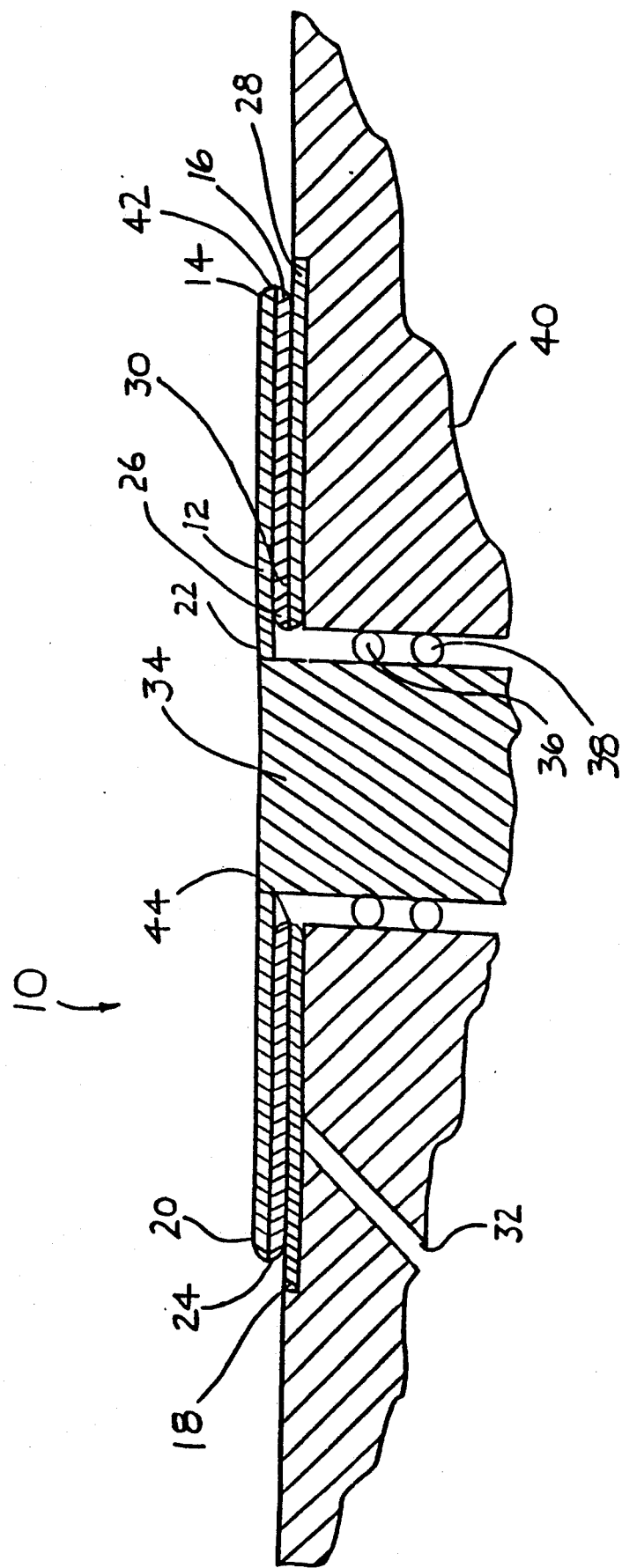
FIG. 1 is a schematic illustration of a compact metallic bellows constructed in accordance with the present invention shown in partial section with the bellows in an unpressurized condition.

Referring now to the drawings there is shown a preferred embodiment for the compact metallic bellows and inner weld fixture of this invention. The compact metallic bellows is described in connection with fluid pressure activated compact metallic bellows for a valve actuator in an extremely compact operating environment. The compact metallic bellows of the present invention is particularly adapted for fitting into a small space and taking advantage of its equal free length and solid length to provide a spring force equal the sum of the spring force of each metallic diaphragm.

The drawings (FIGS. 1 and 2) show a compact metallic bellows assembly 10 including a plurality of individual diaphragm members 12 welded together as further described below. For purposes of clarity the diaphragms are referred to as a first diaphragm member 14, a second diaphragm member 16, and a third diaphragm member 18. It will be understood that conventional bellows arrangements are not necessarily limited in outer shape. Oval, rectangular or square plate members can be used just as readily as circular members.

In a preferred embodiment of the present invention the metallic diaphragm members 12 are circular. The first diaphragm member 14 includes a first outer edge 20 and a first inner edge 22. Similarly, the second diaphragm member 16 includes a second outer edge 24 and a second inner edge 26. Finally, it will be seen that the third diaphragm member 18 includes a third outer edge 28 and a third inner edge 30.

Figure 2:
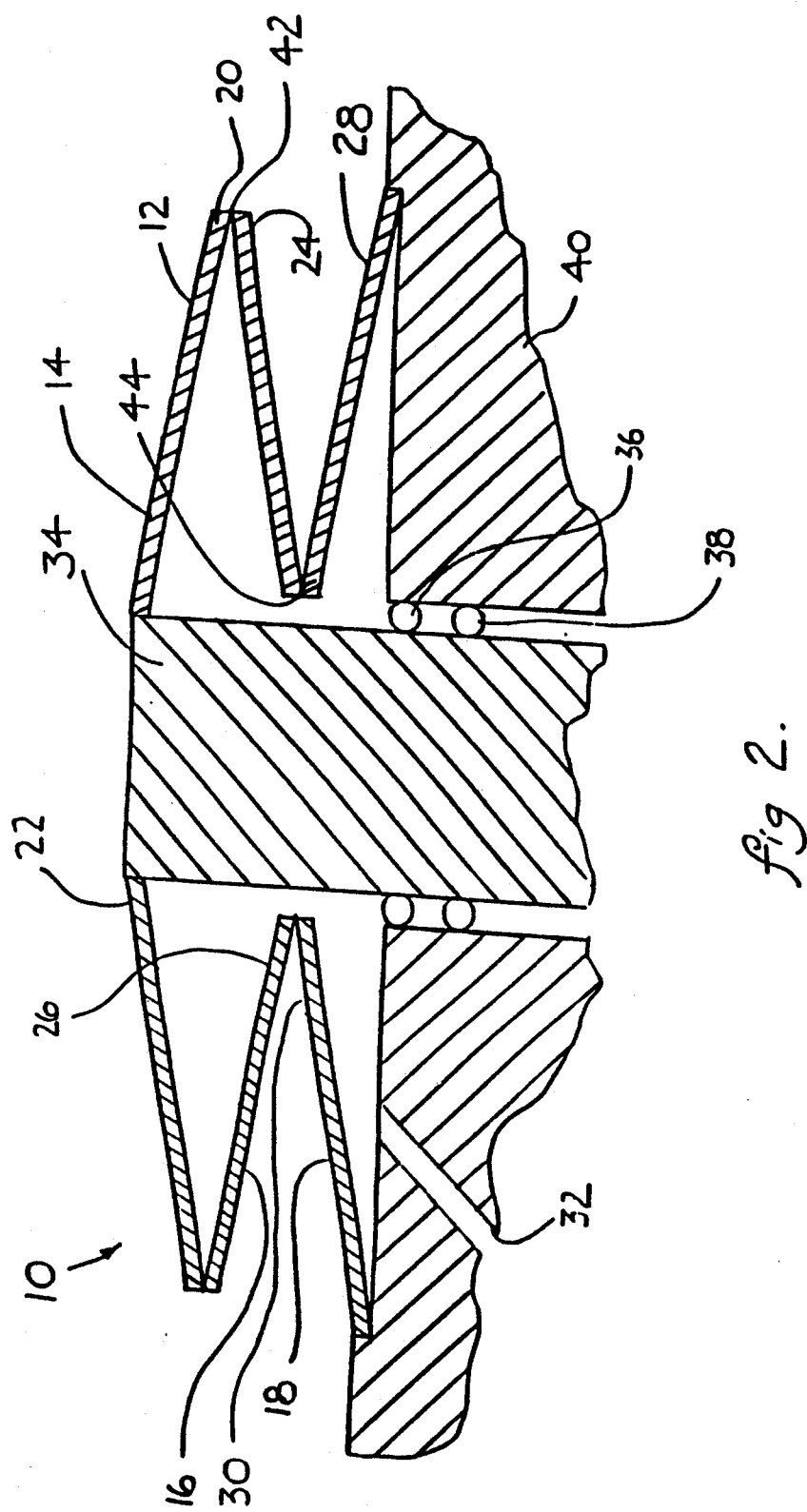
FIG. 2 is a schematic illustration of the compact metallic bellows depicted in FIG. 1 and in a pressurized condition.

It will be recalled that the Background of the Invention referred to one intended use of the present invention in a valve actuator arrangement in a confining operating environment. Accordingly, FIGS. 1 and 2 depict a pressure connection 32 between a positive displacement pump (not shown) and the interior of the compact metallic bellows of this invention. The expansion of the compact metallic bellows 10 and desired precise movement of a valve actuator 34 is responsive to a pressure increase.

Completing the schematic depiction of a system constructed in accordance with this invention is one valve actuator seal 36 and another valve actuator seal 38 cooperating between the valve actuator 34 and a bellows fixture member 40 which maintains the compact metallic bellows 10 under pressure when desired.

The details of this arrangement need not be described in any further detail since the valve actuator is a known and well understood device. It is the ability to provide the compact metal bellows that is the present invention.

Removing or reducing the pressure allows the compact metallic bellows spring force to return the compact metallic bellows to its free position, which is also its solid condition, all in accordance with the present invention. It will be understood that the basic design conditions for a bellows rule for the present invention. Furthermore, many bellows manufacturers provide design manuals with their promotional material.

Conventional bellows design is often the application of one or more design criteria as suggested by the bellows manufacturers. What will stand out among the design and application information including, for example, available diaphragm contours, application guidelines, welded bellows characteristics, tolerances, and formulas is that the present invention suggests a solid length and free length relationship generally not contemplated.

A typical design manual is illustrated in Pacific Scientific/Belfab Division (7.5M-10/85). In the identified design manual a footnote is appended to the General Formula portion. The footnote states that "FOR BEST STRESS/LIFE RESULTS, STROKE SHOULD GENERALLY BE 25% IN EXTENSION AND 75% IN COMPRESSION."

Figure 3:
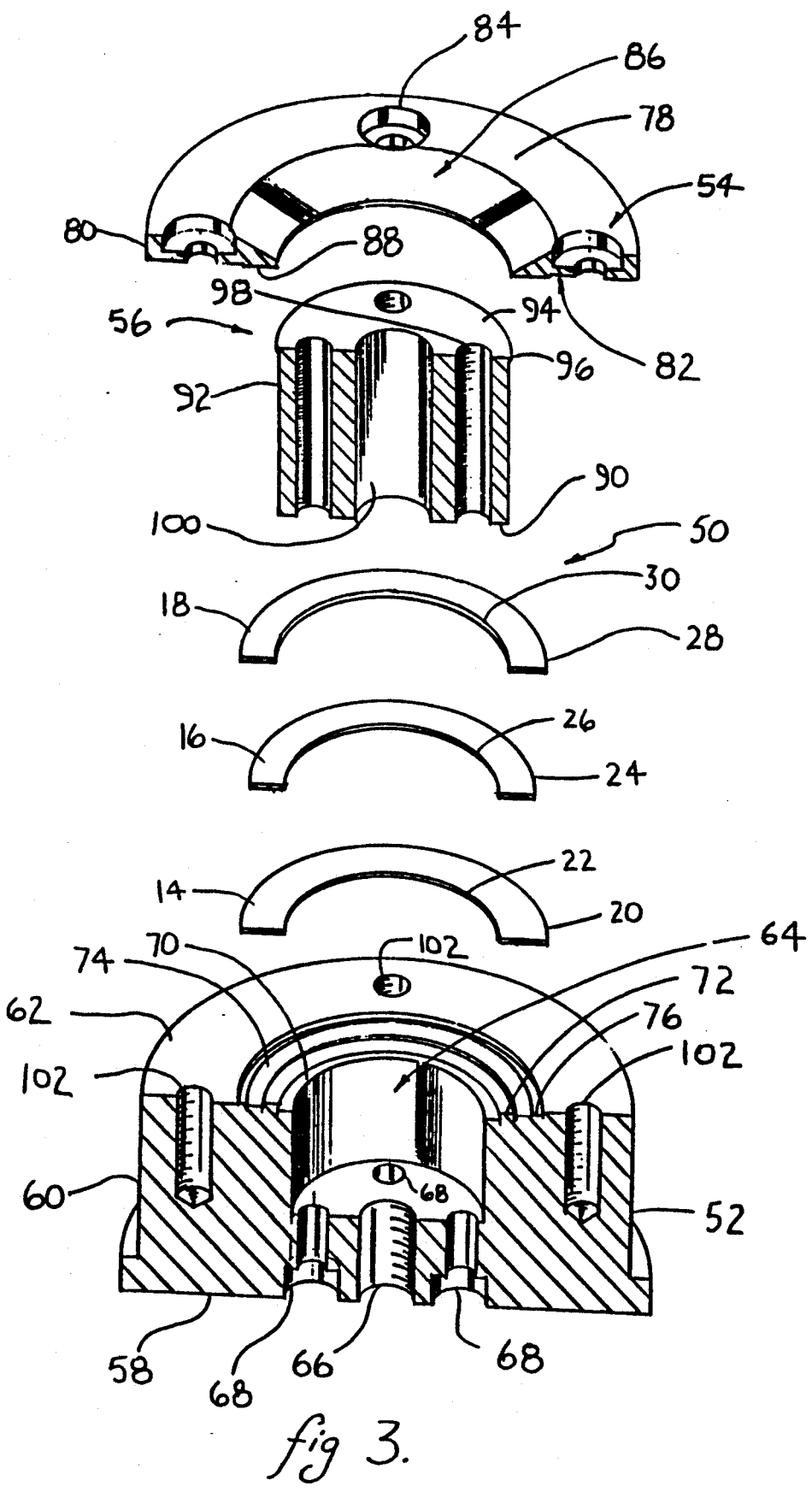
FIG. 3 is an exploded sectional view of a compact metallic bellows in an inner weld fixture constructed in accordance with the present invention.
Figure 4:
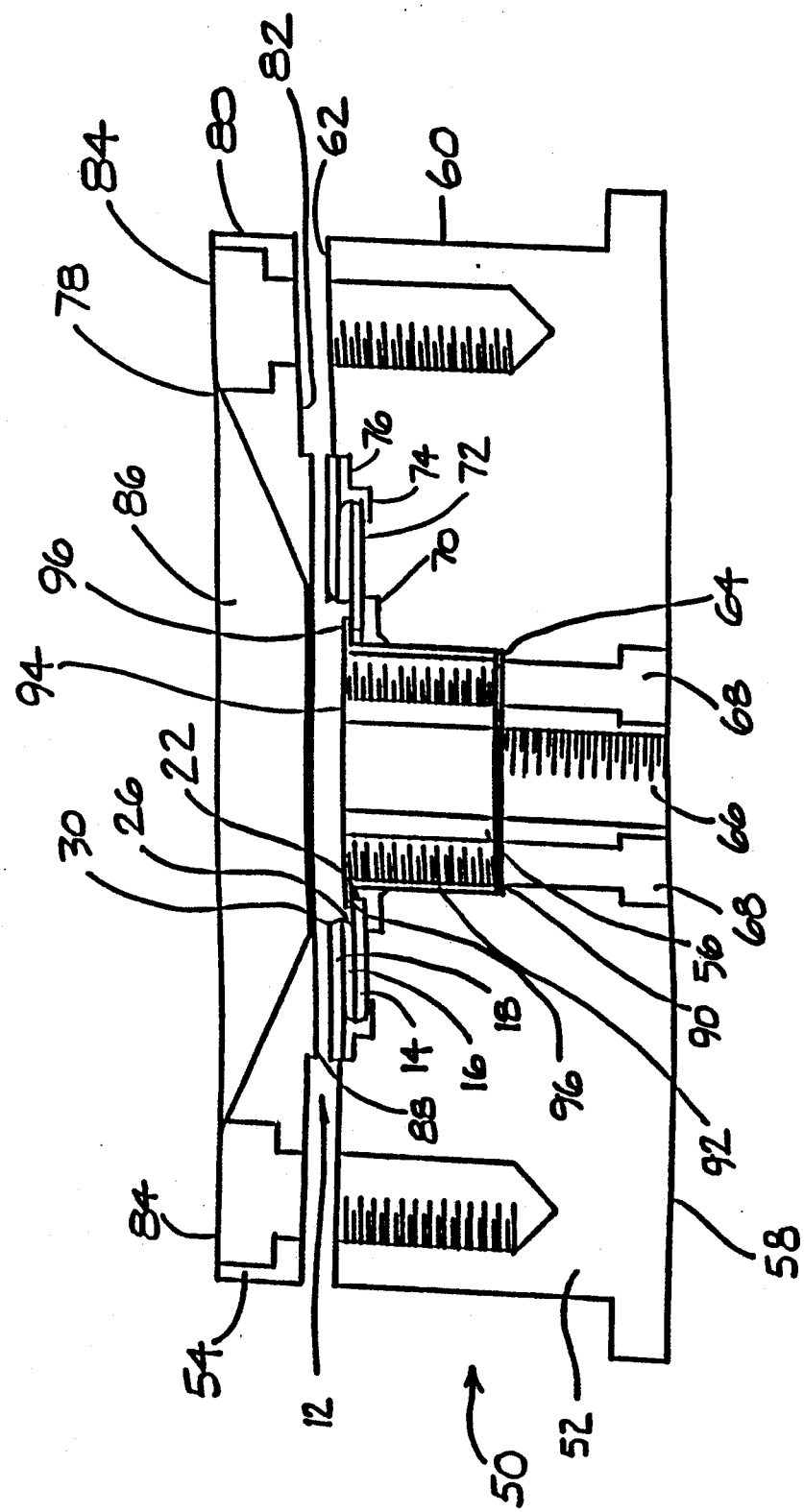
FIG. 4 is a cross-sectional view of a compact metallic bellows in the inner weld fixture illustrating a deflection member for preparing an inner diameter laser weld of the two upper metallic diaphragms.

To accomplish the manufacture of the present invention it has been necessary to develop a clamp arrangement for the metallic diaphragm members. In FIGS. 3 and 4 an inner weld fixture 50 includes a base member 52, a clamp and guide member 54, and a deflection member 56. A preferred embodiment of the inner weld fixture 50 is illustrated in FIGS. 3 & 4.

The base member 52 includes a bottom surface 58, a side wall 60, and a top or diaphragm receiving surface 62. The base member 52 defines a central recess 64 for receiving the deflection member 56. The central recess 64 includes an axial threaded bore 66 and a plurality of generally longitudinal bores 68 that communicate with outer threaded bores 98 in the deflection member 56.

The base member 52 includes a plurality of annular grooves that have been found to facilitate the clamping and inner diameter welding of the diaphragm members 12 as further described below. In the illustrated embodiment there is provided an inner annular groove 70 partially defining an adjacent inner annular shoulder 72. The base member 52 of a preferred embodiment further defines an intermediate annular groove 74 and an outer annular groove 76.

The clamp and guide member 54 includes a top surface 78, a side wall 80 and a bottom surface 82. Peripheral fastener receiving openings 84 are in registration with receiving threaded bores 102 in the base member 52. The most conspicuous feature of the clamp and guide member 54 is its tapered axial opening 86 that terminates in an inner annular shoulder 88.

The deflection member 56 includes a bottom surface 90, side wall 92, and a top surface 94. A deflection flange member 96 extends outward from the deflection member 56 as illustrated in FIGS. 3 and 4. A smooth axial bore 100 is in axial registration with axial threaded bore 66.

In operation, in connection with the manufacture of the preferred circular embodiment of the compact metallic bellows 10 consisting of three metallic diaphragm members 14, 16, and 18 (FIG. 4) it will be understood for purposes of the following description that the outside diameters of the first and second diaphragm members 14 and 16 are approximately equal and the inside diameters of the second and third diaphragm members 16 and 18 are approximately equal.

The first and second outer edges 20 & 24 of the first and second diaphragm members 14 and 16 (FIG. 2 & 4) are laser welded with a high energy beam in order to provide a first outer welded joint 42 that is generally not wider than the thickness of the welded diaphragm members. In a preferred embodiment a laser welding technique is used. A feature of laser welding is the very small beam spot size. This feature has been adapted in the present invention and is a key feature in manufacturing a substantially flat, compact metallic bellows.

In a preferred embodiment 0.004 inch thick titanium sheet is used to manufacture the three circular diaphragms between 1.600 inches (14,16) and 1.749 inches (18) outside diameter and 0.731 inches (14) and 0.900 inches (16,18) inside diameter. The outer diameter edges 20 & 24 of diaphragm members 14 and 16 are laser welded with a high energy beam to provide first outer welded joint 42 (FIG. 2) and the two diaphragm members placed in the inner weld fixture 50 with the third diaphragm member 18 as illustrated in FIGS. 3 and 4.

The deflection flange member 96 of the deflection member 56 placed in the central recess 64 and pulled down will engage the inner edge 22 of the lower or first diaphragm member 14 and deflect the edge away from the abutting juncture of inner diameter edges 26 and 30 of the second and third diaphragm members 16, 18. The required edge deflection is relatively small due primarily to the very small beam spot size created by pulsed laser welding techniques. The shape of the tapered axial opening 86 is intended to facilitate the inner diameter weld. The second and third inner edges 26 & 30 of the second and third diaphragm members 16 and 18 are laser welded with a high energy beam in order to provide a first inner welded joint 44 that is generally not wider than the thickness of the welded diaphragm members.

It will be readily recognized that other opening shapes as well as other arrangements of the inner weld fixture 50 may be provided within the scope of the present invention. Furthermore, the inner weld fixture depicted and described was fabricated specifically for manufacturing a circular three diaphragm member compact metallic bellows.

Additional diaphragm member compact metallic bellows will require variations of the inner weld fixture 50. However, with the knowledge provided by the disclosure, and particularly the novel requirement to deflect adjacent diaphragms not involved in the welding and still manufacture a compact metallic bellows, it will be only a matter of design variation to provide the desired deflection of additional diaphragm member or members as taught by this invention.

Once the inner diameter weld is complete by pulsed laser welding techniques, then the deflection member 56 is backed off and the first inner diameter edge 22 will return to its original position. The compact metallic bellows 10 is now ready for use in the desired application.

Titanium was chosen for the prototype because of its compatibility with other materials in the device in which the compact metallic bellows was intended for use. It will be readily understood that any metallic sheet that can be welded will meet the required conditions.

The illustrated compact metallic bellows has three diaphragm members due to the very short stroke requirements of the design in the prototype bellows which was used. Other uses for the compact metallic bellows of this invention are too numerous to mention. Using known bellows design conditions, other compact metallic bellows can be designed to meet particular stroke and pressure requirements for particular situations.

While specific embodiments have been shown and described, many variations are possible. The particular shape of the bellows and constituent diaphragm members, including their dimensions, may be changed as desired to suit the equipment and the conditions with which it is used. The metal chosen for the components may be selected to be compatible with the environment and associated elements of the device in which the invention is used.

The configuration and number of diaphragm members may vary and those skilled in the art will now understand how to modify the weld fixture accordingly. It will be further understood that the bellows of the present invention having a free length equal to its solid height suggests many other possible applications for the bellows. Possible applications could include pressure sensors, mechanical seals, volume compensators, fluid accumulators, expansion joints, fluid shock absorbers, actuators and pumps to name a few.

Finally, it will be recognized that modifications to the inner edge weld fixture are within the scope of the present invention. While other types of fixtures will be required for larger numbers of diaphragm members, one feature necessary for any such inner edge weld fixture is the ability to deflect alternate diaphragm members adjacent to a weld area. The amount of any deflection will take into account the material properties of the diaphragm metal to insure that the deflected edge is not stressed past its yield point or permanently deformed by the deflection.

Having described the invention in detail, those skilled in the art will appreciate that modifications may be made of the invention without departing from its spirit. Therefore, it is not intended that the scope of the invention be limited to the specific embodiment illustrated and described. Rather, it is intended that the scope of this invention be determined by the appended claims and their equivalents.

What is claimed is:

1. A compact metallic bellows, comprising:
    a plurality of flat metallic diaphragm members, each flat metallic diaphragm member having an inner diameter and an outer diameter, either the inner diameter edges or the outer diameter edges of adjacent metallic diaphragm members welded together to form a bellows, the welded edges alternating between the inner diameter edge and the outer diameter edge;
    each diaphragm member having generally parallel facing surfaces and the facing surfaces of adjacent diaphragm members resting in a flat abutting relationship, whereby the bellows has a compressed length and solid height, substantially the same as its free length, and
    a weld joint formed to join the edge of adjacent metallic diaphragm members which weld joint has a width approximately less than or equal to the thickness of the welded metallic diaphragm members and is noninterfacing with the abutting relationship of the facing surfaces.

2. A compact metallic bellows as set forth in claim 1 wherein the plurality of flat metallic diaphragm members is an odd number.

3. A compact metallic bellows as set forth in claim 2 wherein three flat metallic diaphragm members are provided.

4. A compact metallic bellows as set forth in claim 2 wherein the inside diameter of at least one flat metallic diaphragm is less than the remaining flat metallic diaphragms.

5. A compact metallic bellows as set forth in claim 1 wherein the flat metallic diaphragm members have generally circular outside diameter edges.

6. A compact metallic bellows as set forth in claim 1 wherein the flat metallic diaphragm members have generally circular inside diameter edges.

7. A method of welding edges of adjacent flat metallic diaphragm members to manufacture a compact metallic bellows, the method comprising the steps of:
    securing the flat metallic diaphragm members in abutting relationship, the metallic diaphragm members having edges to be joined by welding;
    welding the edges so as to provide a weld joint thickness approximately equal to and no greater than the combined thickness of the metallic diaphragm members, and
    deflecting adjacent flat diaphragm members during the weld process.

8. A method of welding edges of adjacent flat metallic diaphragm members as set forth in claim 7, the method comprising the additional steps of:
    securing outer diameter edges of a first and a second adjacent metallic diaphragm members in abutting relationship for welding attachment;
    laser welding the outer diameter edges, thereby providing a laser welded joint in which the weld joint thickness is approximately equal to and not greater than the combined thickness of the metallic diaphragm members.

9. A method of welding edges of adjacent flat metallic diaphragm members as set forth in claim 8, the method comprising the additional steps of:
    securing inner diameter edges of the second and a third adjacent metallic diaphragm members in abutting relationship for welding attachment; and
    laser welding the inner diameters, thereby providing a laser welded joint in which the weld joint thickness is approximately equal and not greater than the combined thickness of the metallic diaphragm members.

10. A method of welding adjacent flat metallic diaphragm members as set forth in claim 9, the method comprising the additional step of deflecting the first metallic diaphragm so as to expose the inner diameter edges to be welded.

* * * * *

UNITED STATES PATENT AND TRADEMARK OFFICE
CERTIFICATE OF CORRECTION

PATENT NO. : 5,154,108

DATED : October 13, 1992

INVENTOR(S) : Gordon R. McClellan

It is certified that error appears in the above-indentified patent and that said Letters Patent is hereby corrected as shown below:

On the title page, under item [19] and item [75], change "McClelland" to --McClellan--.

Signed and Sealed this

Twenty-first Day of December, 1993

Attest:

BRUCE LEHMAN

*Attesting Officer*   Commissioner of Patents and Trademarks